US012803942B2

(12) United States Patent
Ushinohama

(10) Patent No.: US 12,803,942 B2
(45) Date of Patent: Nov. 17, 2026

(54) IMAGE PROCESSING APPARATUS, IMAGE PROCESSING SYSTEM, AND IMAGE PROCESSING METHOD

(71) Applicant: CANON KABUSHIKI KAISHA, Tokyo (JP)

(72) Inventor: Takuya Ushinohama, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/807,316

(22) Filed: Aug. 16, 2024

(65) Prior Publication Data

US 2025/0071075 A1 Feb. 27, 2025

(30) Foreign Application Priority Data

Aug. 21, 2023 (JP) ................................ 2023-133941

(51) Int. Cl.
*G06F 15/16* (2006.01)
*G06Q 10/1093* (2023.01)
*H04L 51/10* (2022.01)

(52) U.S. Cl.
CPC ......... *H04L 51/10* (2013.01); *G06Q 10/1093* (2013.01)

(58) Field of Classification Search
CPC ..... H04L 12/1827; H04L 51/10; G06F 3/041; G06Q 10/109; G06Q 10/107; G06Q 10/1093; G06T 1/0007; H04N 7/15
See application file for complete search history.

(56) References Cited

U.S. PATENT DOCUMENTS

| | | | | |
|---|---|---|---|---|
| 7,353,252 | B1 * | 4/2008 | Yang | G06Q 10/10 709/204 |
| 9,461,834 | B2 * | 10/2016 | Ferlitsch | G06Q 10/109 |
| 12,294,555 | B2 * | 5/2025 | Kim | H04L 51/02 |
| 2007/0050450 | A1 * | 3/2007 | Manion | H04L 67/34 709/204 |
| 2011/0264745 | A1 * | 10/2011 | Ferlitsch | G06Q 10/109 709/204 |
| 2017/0357917 | A1 * | 12/2017 | Holmes | G06Q 10/02 |
| 2017/0374425 | A1 * | 12/2017 | Disley | G06F 3/147 |
| 2021/0150423 | A1 * | 5/2021 | Tomosugi | G06F 21/31 |
| 2022/0027110 | A1 * | 1/2022 | Abe | G06F 3/1203 |
| 2022/0210373 | A1 * | 6/2022 | Kim | G06F 9/54 |
| 2023/0031018 | A1 * | 2/2023 | Kim | H04L 51/02 |
| 2023/0353397 | A1 * | 11/2023 | Gal | H04L 12/1813 |
| 2024/0257064 | A1 * | 8/2024 | Fernando | G06F 3/0482 |
| 2025/0055958 | A1 * | 2/2025 | Myers | H04N 7/152 |
| 2026/0010340 | A1 * | 1/2026 | Nguyen | G06F 3/165 |

FOREIGN PATENT DOCUMENTS

| | | | |
|---|---|---|---|
| JP | 2010273256 A | | 12/2010 |
| JP | 2020109899 A | * | 7/2020 |

* cited by examiner

*Primary Examiner* — Suraj M Joshi
*Assistant Examiner* — Hao H Nguyen
(74) *Attorney, Agent, or Firm* — Canon U.S.A., Inc. IP Division

(57) ABSTRACT

An image processing apparatus of the present invention includes: a scanning unit configured to scan an original to generate image data; an acquisition unit configured to acquire information about participants in an online meeting from an online meeting service; a determination unit configured to determine a recipient based on the acquired information; and a sending unit configured to send the generated image data to the recipient determined by the determination unit.

14 Claims, 16 Drawing Sheets

FIG. 6

| MEETING NAME | MEETING DATE AND TIME | PARTICIPANTS | ORGANIZER | MEETING URL |
|---|---|---|---|---|
| REGULAR MEETING | DAILY 8:30～9:00 | UserO<br>UserP<br>UserQ<br>UserR<br>⋮ | UserO | https://meeting.com/NjLWaEzZTMt |
| INFORMATION SHARING SESSION | 4/23/2023 10:00－11:00 | UserA<br>UserB<br>UserC<br>UserD | UserB | https://meeting.com/ZTFdiNjQtNm |
| BRIEFING SESSION | 4/23/2023 13:00－14:30 | UserL<br>UserM<br>UserN<br>UserO<br>⋮ | UserN | https://meeting.com/Q3ZS0g0uiMj |

FIG. 7

| USERNAME | EMAIL ADDRESS | CHAT ID |
| --- | --- | --- |
| UserA | AAA.aaa@mail.com | 7cdcf904d878 |
| UserB | BBB.bbb@mail.com | 4c72f3d518bb |
| UserC | CCC.ccc@mail.com | f5a6b65087c5 |
| ⋮ | ⋮ | ⋮ |

IMAGE PROCESSING APPARATUS, IMAGE PROCESSING SYSTEM, AND IMAGE PROCESSING METHOD

BACKGROUND OF THE INVENTION

Field of the Invention

The present invention relates to an image processing apparatus, an image processing system, and an image processing method.

Description of the Related Art

Japanese Patent Laid-Open No. 2010-273256 discloses techniques for identifying a user participating in an online meeting based on a video image and sending a scanned image to the identified user. This allows materials to be shared among participants in online meetings, enabling smoother information sharing.

In the case of sending image data generated by scanning from an image forming apparatus to participants in an online meeting, it is necessary to enter the recipient information of the participants at the image forming apparatus. If there are many participants, entering the recipient information can become burdensome. Additionally, if the participants in the online meeting are not known, there is also the hassle of checking the participants from schedule information in an online meeting system.

SUMMARY OF THE INVENTION

The present invention provides techniques for easily sending image data generated by scanning to participants in an online meeting.

An image processing apparatus of the present invention includes: a scanning unit configured to scan an original to generate image data; an acquisition unit configured to acquire information about participants in an online meeting from an online meeting service; a determination unit configured to determine a recipient based on the acquired information; and a sending unit configured to send the generated image data to the recipient determined by the determination unit.

Further features of the present invention will become apparent from the following description of exemplary embodiments with reference to the attached drawings.

BRIEF DESCRIPTION OF THE DRAWINGS

FIG. 6 illustrates an example of meeting schedule information managed by the online meeting server.

FIG. 7 illustrates an example of user information managed by the online meeting server.

DESCRIPTION OF THE EMBODIMENTS

Hereinafter, embodiments of the present invention will be described in detail with reference to the drawings. Note that the following embodiments are not intended to limit the invention according to the claims, and not all of the combinations of features described in the embodiments are essential to the solution of the invention.

First Embodiment

A first embodiment of the present invention will be described.

Figure 1:
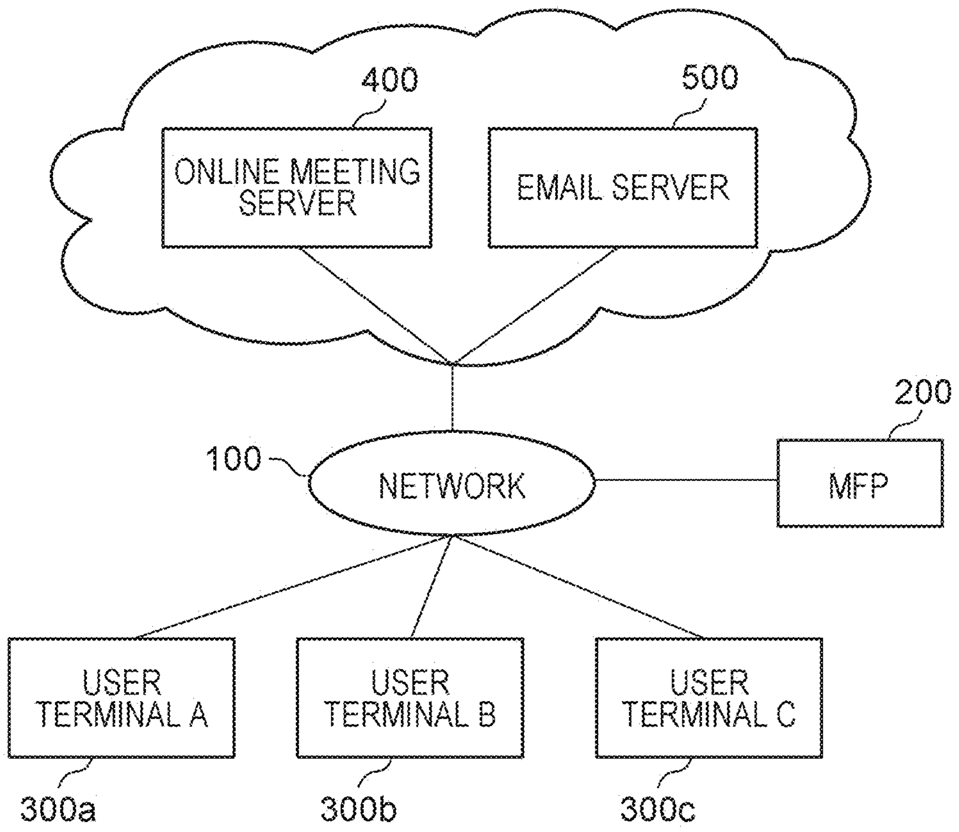
FIG. 1 is a configuration diagram of a network.

FIG. 1 is a diagram illustrating an example of a system configuration of the present invention. In an image processing system illustrated in FIG. 1, a multi-functional peripheral (MFP) 200 and multiple terminal devices 300*a* to 300*c* are communicatively connected to an online meeting server 400 and an email server 500 via a network 100. Note that the network 100 of this example may be the Internet or may be a local area network (LAN). Additionally, the network 100 may be wired or wireless.

The MFP 200 has the function of scanning and digitizing paper originals. The MFP 200 attaches the scanned data to an email message so as to send it to one or more recipients specified by the user, and sends it to the email server 500. The terminal devices 300*a* to 300*c* are electronic devices such as user-owned personal computers (PCs), smart phones, and tablet PCs. The online meeting server 400 is a server that communicates with the terminal devices 300*a* to 300*c* connected via the network 100 and manages online meetings conducted using the terminal devices 300*a* to 300*c*. The email server 500 forwards the email message sent from the MFP 200 using a protocol such as the Simple Mail Transfer Protocol (SMTP) to the user terminals 300*a* to 300*c* which are the specified recipients. In the following description, in the case where equivalent processing is performed at the terminal devices 300*a* to 300*c*, the terminal devices 300*a* to 300*c* will be described collectively as the terminal device 300.

Figure 2:
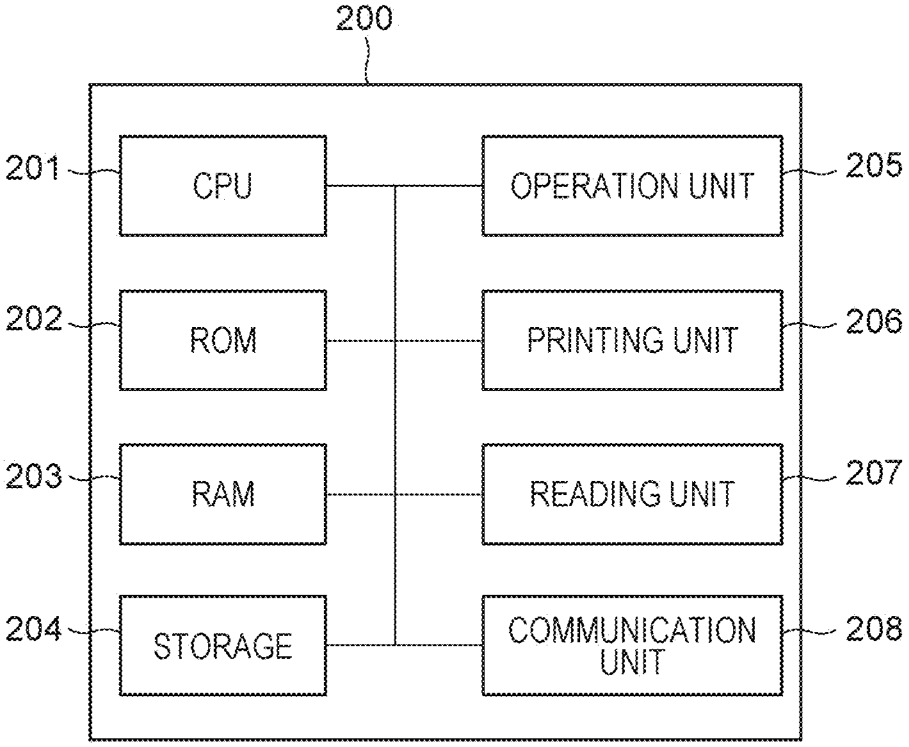
FIG. 2 is a configuration diagram of a multi-functional peripheral (MFP).

FIG. 2 is a diagram illustrating an example of the hardware configuration of the MFP 200. The MFP 200 includes a central processing unit (CPU) 201, a read-only memory (ROM) 202, a random-access memory (RAM) 203, a storage 204, an operation unit 205, a printing unit 206, a reading unit 207, and a communication unit 208. The CPU 201 controls the operation of the entire MFP 200. The CPU 201 reads a control program stored in the ROM 202 or the storage 204 into the RAM 203 to perform various controls such as reading control and printing control. The ROM 202 stores a control program executable by the CPU 201. The RAM 203 is the main storage memory, and is used as a work area, or a temporary storage area for expanding various control programs stored in the ROM 202 and the storage 204. The storage 204 stores image data, print data, various programs, and various settings information. In this example, flash memory is assumed as the storage 204, but an auxiliary storage device such as a solid state drive (SSD) or a hard disk drive (HDD) may be used. Alternatively, an embedded MultiMediaCard (eMMC) may be used. Although the MFP 200 in this example is assumed to have one CPU 201 executing each process illustrated in a later-described sequence using one RAM 203, it is not limited to this configuration. For example, multiple CPUs, RAMs, ROMs, and storages may cooperate to execute each of processes illustrated in later-described flowcharts. Additionally, it is acceptable to execute some of the processes using hardware circuits such as an application-specific integrated circuit (ASIC) and a field-programmable gate array (FPGA).

The operation unit 205 includes a display unit such as a touchscreen, and hardware keys. The operation unit 205 displays information to the user and detects entries from the user. The printing unit 206 prints image data (print data) stored in the RAM 203 onto a recording sheet fed from a paper drawer. The reading unit 207 reads an image of an original, and the CPU 201 converts that image into image data, such as binary data. Note that the reading unit 207 is equipped with a feeder for transporting originals, which can transport multiple sheets of originals placed on the platen glass, enabling scanning of the images of the transported originals. Image data generated based on the images read by the reading unit 207 is sent to an external device or printed on recording sheets. The communication unit 208 connects to the network 100. Additionally, the communication unit 208 sends image data to an external device on the network 100 or receives print data from the terminal device 300. As a method of sending and receiving via the network 100, it is possible to perform sending and receiving using email, as well as file transmission using other protocols (such as the File Transfer Protocol (FTP), Server Message Block (SMB), Web Distributed Authoring and Versioning (WebDAV), etc.) Furthermore, various settings data can be sent and received via the network 100 with access using Hypertext Transfer Protocol (HTTP) communication from the terminal device 300.

Figure 3:
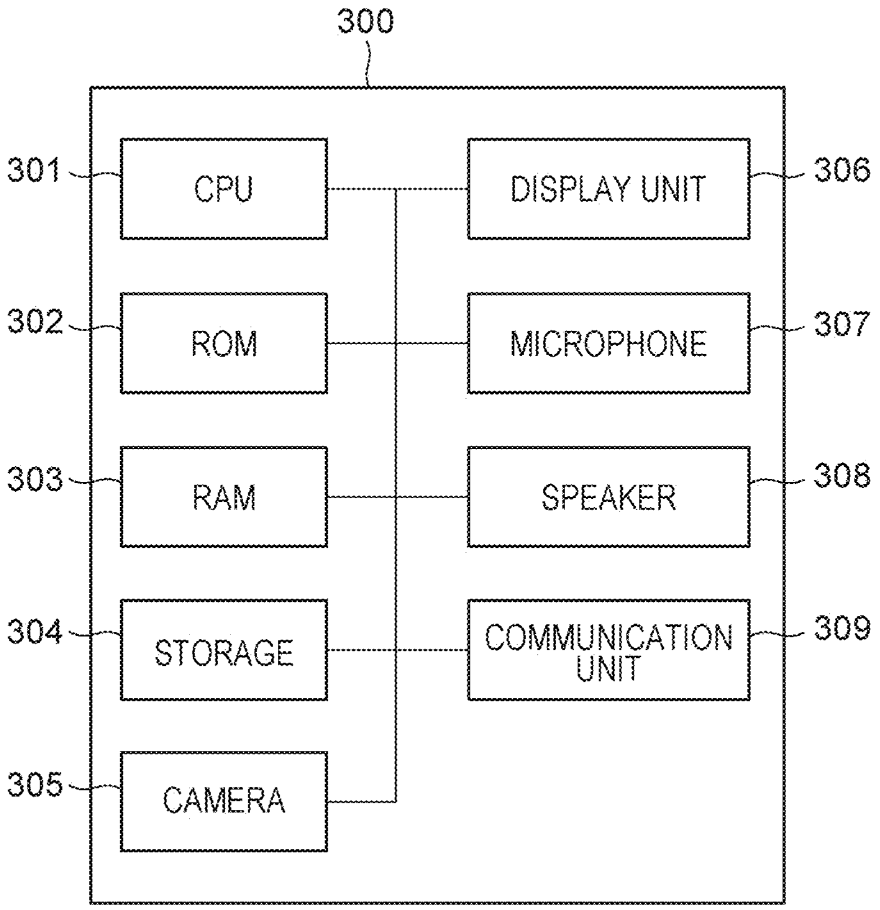
FIG. 3 is a configuration diagram of a terminal device.

FIG. 3 is a diagram illustrating an example of the hardware configuration of the terminal device 300. The terminal device 300 includes a CPU 301, a ROM 302, a RAM 303, a storage 304, a camera 305, a display unit 306, a microphone 307, a speaker 308, and a communication unit 309. The CPU 301 controls the operation of the entire terminal device 300. The CPU 301 reads a control program stored in the ROM 302 or the storage 304 into the RAM 303 to execute various processes for controlling the operation of the terminal device 300. The ROM 302 stores a control program executable by the CPU 301. The RAM 303 is the main storage memory, and is used as a work area, or a temporary storage area for expanding various control programs stored in the ROM 302 and the storage 304. The storage 304 stores application data, various programs, and various settings information. The camera 305 is an imaging device that uses an image sensor that converts light into an electrical signal to input information of the surrounding environment as image data. The display unit 306 is a display device such as a liquid crystal panel. The display unit 306 displays image data processed by the CPU 301 or image data input via the camera 305. The microphone 307 converts sound into audio data, and the speaker 308 outputs audio data input from the microphone 307 or audio signals processed by the CPU 301. The communication unit 309 sends and receives data to and from the online meeting server 400, the email server 500, and the MFP 200 via the network 100. The configuration illustrated in FIG. 3 is only an example, and the terminal device 300 need not be equipped with all of these units.

Figure 4:
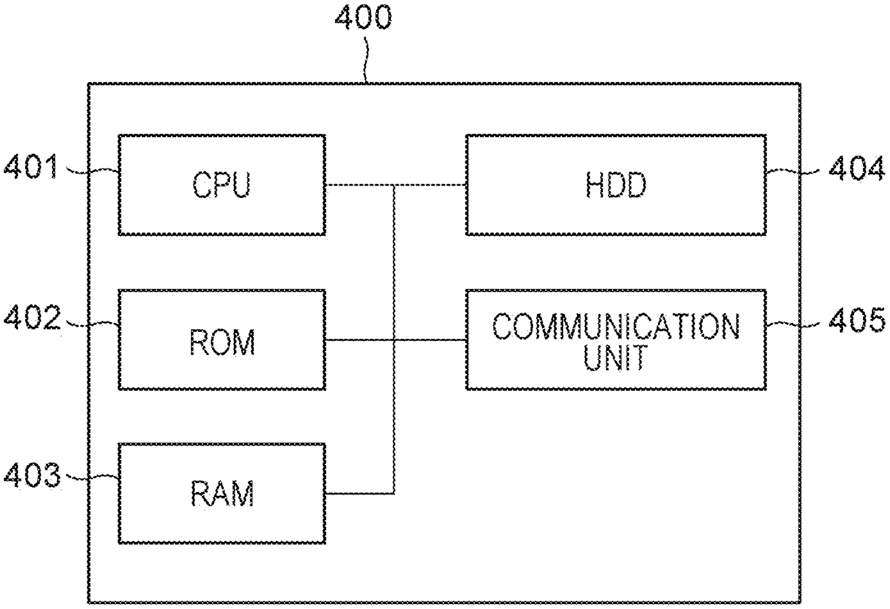
FIG. 4 is a configuration diagram of an online meeting server.

FIG. 4 is a diagram illustrating an example of the hardware configuration of the online meeting server 400. A CPU 401 reads a control program stored in a ROM 402 to execute various processes for controlling the operation of online meeting services provided by the online meeting server 400. The ROM 402 stores a control program. A RAM 403 is used as the main memory of the CPU 401 as well as a temporary storage area such as a work area. An HDD 404 stores various data such as video, audio, user information of participants in online meetings, and schedule information of online meetings. A communication unit 405 can send and receive data to and from various devices such as the MFP 200 and the terminal device 300 via the network 100. On receipt of an instruction to start an online meeting, reported from the terminal device 300, the online meeting server 400 generates moving image data from audio and video data sent from the terminal device 300, and sends it to the terminal device 300. Additionally, the online meeting server 400 issues a meeting Uniform Resource Locator (URL) for participating in the online meeting, and the online meeting's participants can participate in the online meeting by accessing the issued meeting URL. Note that the communication unit 405 may perform wired communication using Ethernet or perform wireless communication using Wi-Fi or the like.

Figure 5:
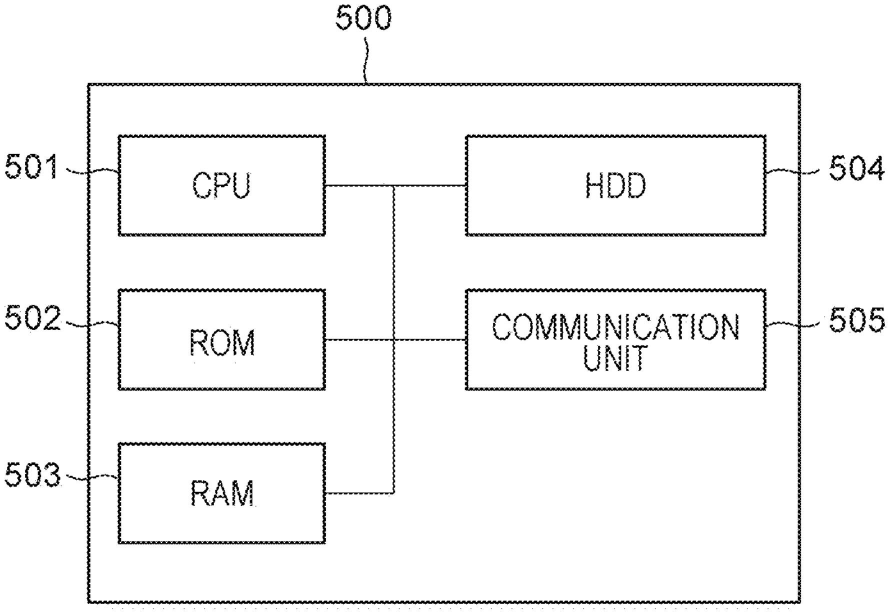
FIG. 5 is a configuration diagram of an email server.

FIG. 5 is a diagram illustrating an example of the hardware configuration of the email server 500. A CPU 501 reads a control program stored in a ROM 502 to execute various processes for controlling the operation of the email server 500. The ROM 502 stores a control program. A RAM 503 is used as the main memory of the CPU 501 as well as a temporary storage area such as a work area. An HDD 504 stores various data such as email data and email address information. The email server 500 has email receiving and forwarding functions provided by services such as SMTP. A communication unit 505 receives emails and electronic data attached thereto sent from the MFP 200 via the network 100 and forwards them to the terminal device 300. Note that the communication unit 505 may perform wired communication using Ethernet or perform wireless communication using Wi-Fi or the like.

FIG. 6 is an example of an online meeting schedule list stored in the HDD 404 of the online meeting server 400. The schedule list contains schedule information consisting of each online meeting's meeting name, date and time, participants, organizer, and meeting URL for participating in the meeting. When the organizer of an online meeting wants to hold an online meeting, the organizer sends a meeting instruction from the terminal device 300 to the online meeting server 400, including the meeting name, date and time, and the desired attendees. On receipt of the meeting instruction, the online meeting server 400 issues a meeting URL, associates it with the meeting name and the like included in the meeting instruction, and adds them as schedule information to the schedule list. The schedule list contains not only schedule information for ongoing or upcoming online meetings, but also schedule information for past online meetings. Furthermore, in response to requests for schedule information from the MFP 200 and the terminal device 300, the online meeting server 400 sends them back the requested schedule information. For example, in response to a request from the MFP 200 for schedule information for an online meeting in which a specific user participates, the online meeting server 400 searches the list for schedule information for online meetings whose participants include that user, and sends back the requested schedule information to the MFP 200.

FIG. 7 illustrates an example of a user information list of users participating in online meetings stored in the HDD 404 of the online meeting server 400. The user information list contains user information, such as each user's username, and email address and chat ID serving as the address for sending electronic data to an individual user. The username is a name used to identify an individual in an online meeting and is used to designate attendees of the online meeting or to indicate users who are participating in the meeting. The user information is information that is registered in advance when using an online meeting service, but it is acceptable to have only one of either an email address or a chat ID registered. Additionally, the recipient information to be registered is not limited to email or chat service addresses; it can also include URLs for cloud storage or fax numbers prepared for each individual, as long as they are services capable of sending electronic data.

Figure 8:
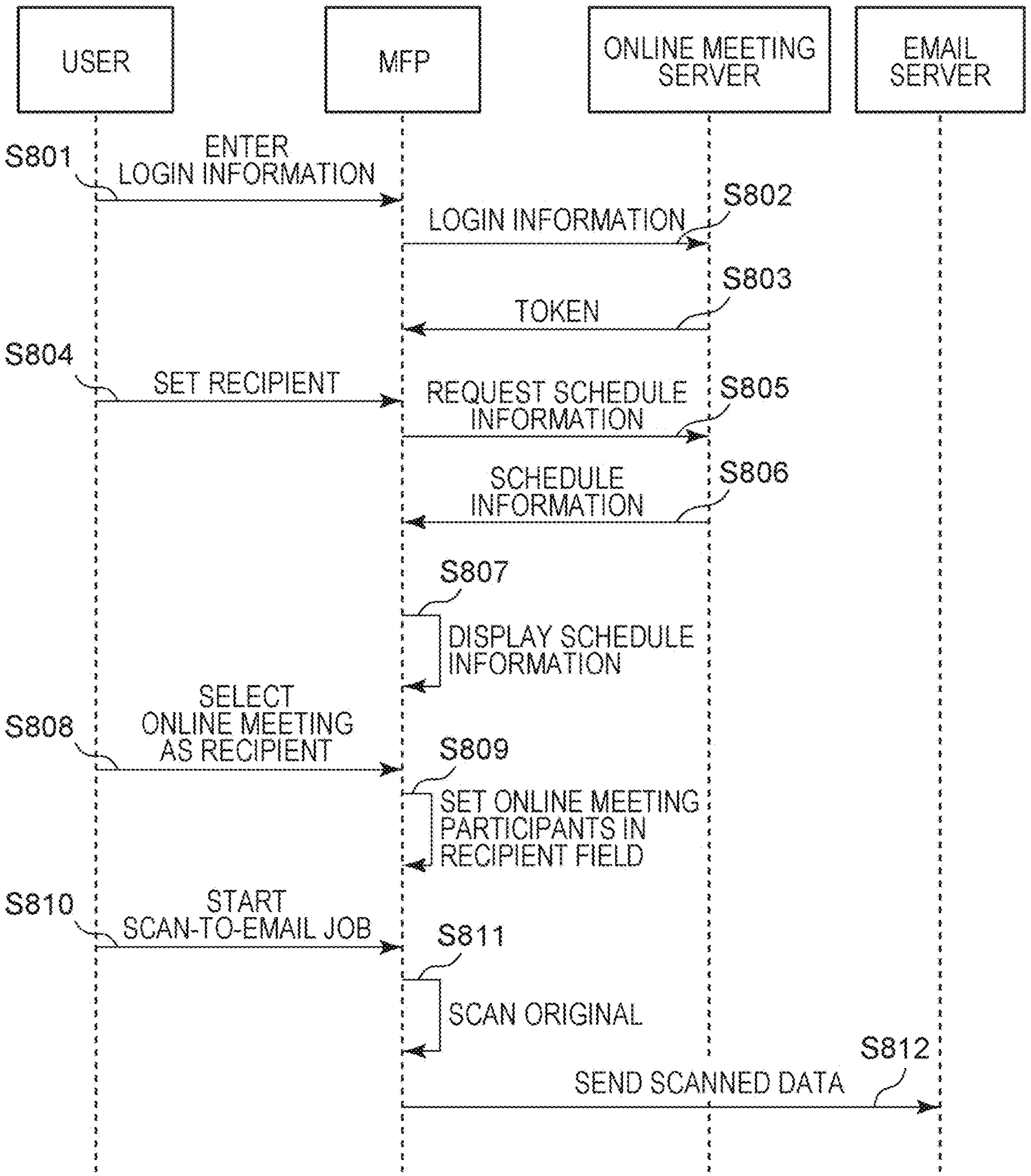
FIG. 8 is a sequence diagram of sending scanned data to participants in an online meeting.

FIG. 8 is a diagram illustrating an example of a sequence of sending a file, which is scanned and generated by the MFP 200, via email to participants in an online meeting. The sequence illustrated in FIG. 8 starts in response to selecting a scan-to-email button 1002 displayed on a home screen 1001 illustrated in FIG. 10, which will be described later.

In S801, the user enters the user's user ID and password on the operation unit 205 of the MFP 200 to log in to the online meeting system. In an information acquisition request to the online meeting server 400 in the following steps, it is assumed that token information acquired by sending the user ID and password entered in S801 to the online meeting server 400 is used. Note that the user ID and password entered by the user in S801 may be used as they are for authentication. Furthermore, it is acceptable to use login information stored in the MFP 200 as login information to be entered by the user in S801; in that case, the user proceeds to step S802 without entering information to log in to the online meeting server 400.

In S802, the CPU 201 of the MFP 200 controls the communication unit 208 to send the login information entered in S801 to the online meeting server 400.

In S803, on receipt of the login information sent from the MFP 200 in S802, the online meeting server 400 issues a token required for an information acquisition request to the online meeting server 400, and sends the token to the MFP 200.

In S804, the user performs an operation on a screen for setting the recipient of scanned data to select an online meeting as the recipient from among items of schedule information for online meetings.

In S805, the CPU 201 of the MFP 200 controls the communication unit 208 to request schedule information from the online meeting server 400 via HTTP communication. Specifically, the CPU 201 of the MFP 200 sends to the online meeting server 400 the token information acquired in S803 and information indicating a request for schedule information for online meetings whose participants include a user indicated by the token information. Note that the requested schedule information is not limited to oncoming schedules, but may also include schedule information for past online meetings.

Additionally, it is acceptable to request schedule information focusing on the upcoming meetings.

In S806, the CPU 401 of the online meeting server 400 checks whether access is permitted based on the token information attached to the schedule information acquisition request sent from the communication unit 208 of the MFP 200 in S805. If access is permitted, a search is conducted based on the schedule information acquisition request to find schedule information for online meetings whose participants include a user indicated by the token information. As a result of the search, the corresponding schedule information and user information associated with the usernames of participants in an online meeting included in each item of the schedule information are sent as response information of HTTP communication to the MFP 200 via the communication unit 405 of the online meeting server 400.

In S807, the CPU 201 of the MFP 200 generates an online meeting selection screen 1012 based on the schedule information received in S806. When the online meeting selection screen 1012 is displayed on the operation unit 205, the MFP 200 waits for the user's operation. The online meeting selection screen 1012 will be described in the description of FIG. 10.

In S808, with an online meeting selected on the online meeting selection screen 1012, the CPU 201 of the MFP 200 determines the online meeting in which the user serving as the recipient participates.

In S809, the CPU 201 of the MFP 200 generates a recipient selection screen 1014 based on the schedule information for the online meeting selected in S808 and the user information. On the recipient selection screen 1014, email addresses associated with the usernames of participants included in the schedule information are displayed on the recipient selection screen 1014. The user can select a recipient to send the scanned data from a list of email addresses displayed on the recipient selection screen 1014. The MFP 200 sets the email address selected by the user as the scan-to-email recipient. The recipient selection screen 1014 will be described in the description of FIG. 10.

In S810, the CPU 201 of the MFP 200 accepts a scan-to-email execution instruction via the operation unit 205.

In S811, the CPU 201 of the MFP 200 controls the reading unit 207 to scan the original and generate an image file.

In S812, the MFP 200 sends the image file generated in S811 via the communication unit 208 to the email address set to the email server 500 in S809.

Figure 9A:
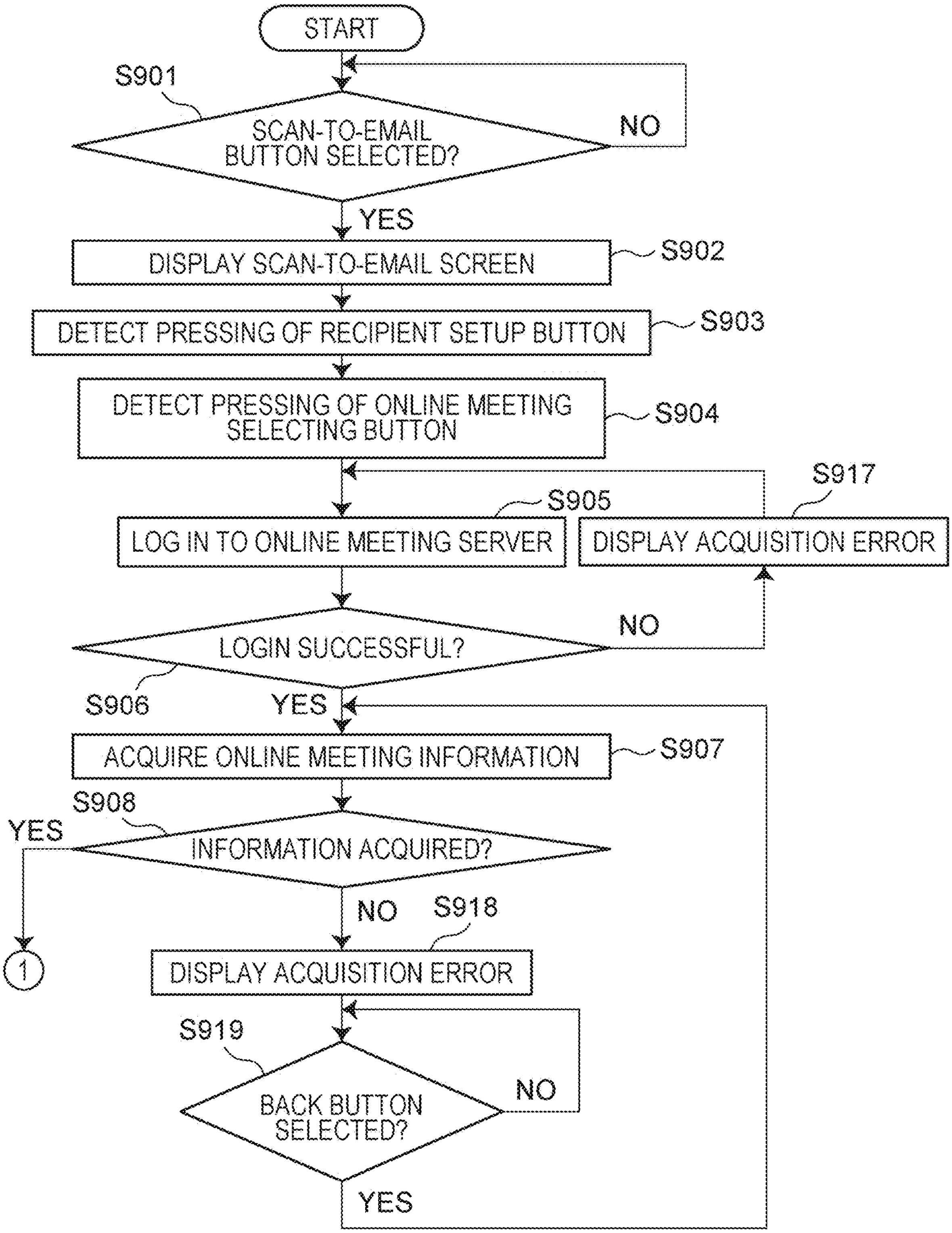
FIGS. 9A and 9B constitute a flowchart of sending scanned data to participants in an online meeting.
Figure 9B:
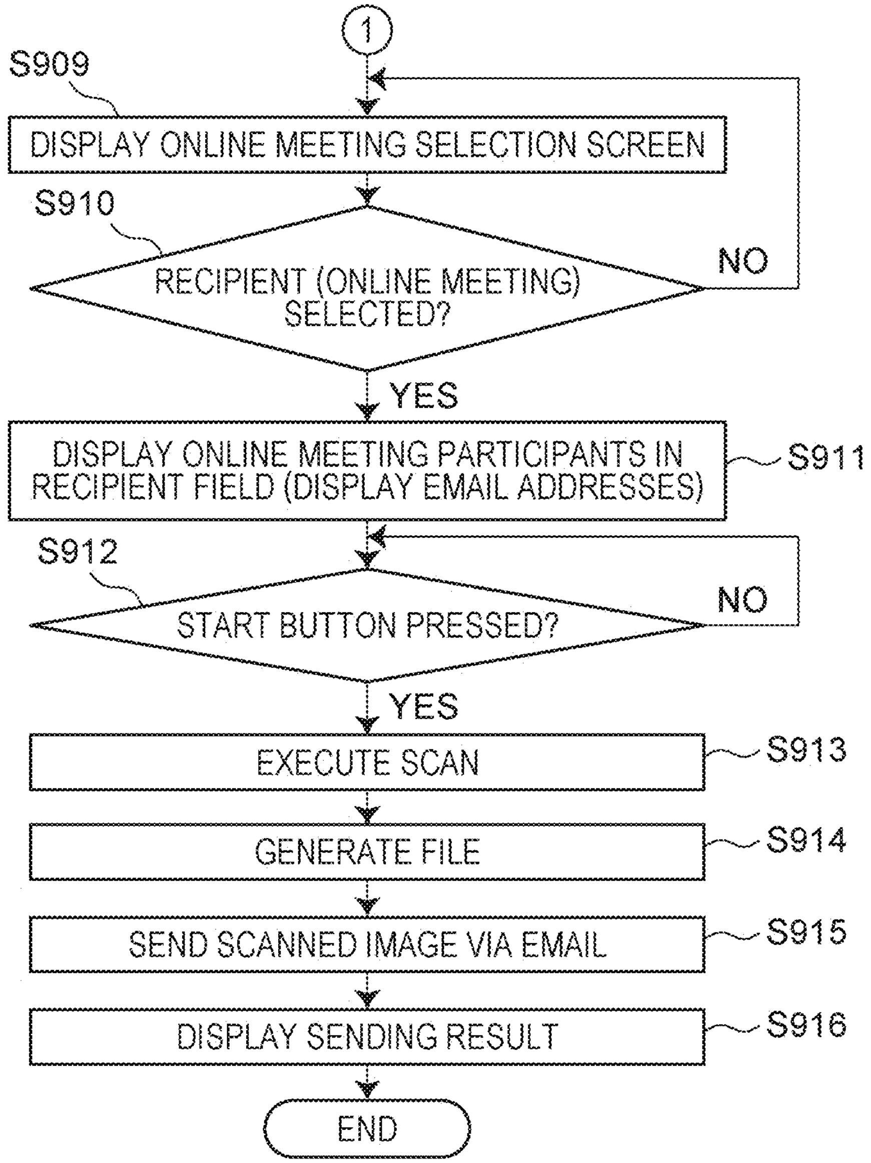

FIGS. 9A and 9B constitute a flowchart illustrating an example of a process of sending scanned data to participants in an online meeting using scan-to-email. The process of this flowchart is executed by the CPU 201 of the MFP 200 reading a program stored in the ROM 202 into the RAM 203. In addition, the flow illustrated in FIGS. 9A and 9B starts upon the powering on of the MFP 200.

In S901, the CPU 201 determines whether the later-described scan-to-email button 1002 has been selected. If it is determined that the button 1002 has been selected, the process proceeds to S902. Otherwise, the process returns to S901.

In S902, the CPU 201 displays a scan-to-email screen 1003 on the operation unit 205.

In S903, the CPU 201 detects that a recipient settings button 1005 on the scan-to-email screen 1003 is selected.

In S904, the CPU 201 detects that an online meeting button 1007 is selected as a recipient setter.

In S905, the CPU 201 uses the login information stored in advance in the MFP 200 to control the communication unit 208 to log in to the online meeting server 400. If no login information is registered in advance in the MFP 200, it is acceptable to display a login screen on the operation unit 205 in S905, where login information can be entered, and, using the entered login information, log in to the online meeting server 400. If the stored login information is to be used, login information registered in association with the user logged into the MFP 200 may be used. This allows the user to log in to and access the online meeting service simply by logging in to the MFP 200. Accordingly, the MFP 200 can acquire schedule information and recipient information corresponding to the user logged into the MFP 200.

In S906, the CPU 201 determines whether a token has been received from the online meeting server 400 for the login information sent in S905. Specifically, it is determined that the token has not been received if the status code in the HTTP communication response indicates an error or if the body information of the response includes a parameter indicating that information could not be acquired. If it is determined that the token has been received, the process proceeds to S907. Otherwise, the process proceeds to S917.

In S917, the CPU 201 displays information indicating that the MFP 200 could not log in to the online meeting server 400 on the scan-to-email screen 1003.

In S907, the CPU 201 uses the token information acquired in S906 to execute a process of sending information indicating that schedule information is requested in HTTP communication to the online meeting server 400.

In S908, the CPU 201 determines whether the CPU 201 has received the schedule information from the online meeting server 400 in response to the schedule information request sent in S907. Specifically, it is determined that the schedule information has not been received if the status code in the HTTP communication response indicates an error or if the body information of the response includes a parameter indicating that information could not be acquired. If it is determined that the schedule information has been received, the process proceeds to S909. Otherwise, the process proceeds to S918.

In S918, the CPU 201 displays information indicating that the online meeting information could not be acquired on the online meeting selection screen 1012. At this time, the online meeting selection screen 1012 does not display any options for online meetings.

In S919, the CPU 201 determines whether a back button 1013 has been selected. If it is determined that the back button 1013 has been selected, the process returns to S907. Otherwise, the process returns to S919.

In S909, the CPU 201 displays a list based on the schedule information received from the online meeting server 400 on the online meeting selection screen 1012. The list of schedule information received from the online meeting server 400 contains the schedule information for online meetings corresponding to the token information sent with the request in S907. In other words, a list of schedules of online meetings corresponding to a user logged into the online meeting service is displayed. The online meetings corresponding to a user logged into the online meeting service are the online meetings that the user has either participated in or is scheduled to participate in. Furthermore, the schedule information includes information about the participants in each online meeting. For example, the schedule information includes the names of users who are participating or have participated in a given online meeting, as well as recipient information.

In S910, the CPU 201 detects, via the operation unit 205, whether an online meeting has been selected on the online meeting selection screen 1012. If it is determined that an online meeting has been selected, the process transitions to S911. Otherwise, the process transitions to S909. The method for detecting selection is whether any item in the list displayed on the online meeting selection screen 1012 has been selected.

In the case of a screen configuration in which a confirm button is displayed on the screen of the operation unit 205, the same transition is performed when the confirm button is selected.

In S911, the CPU 201 controls the operation unit 205 to display the email addresses, which are the recipient information of users who are the participants in the online meeting selected in S910, on the recipient selection screen 1014. On the recipient selection screen 1014, the email addresses of all users participating in the online meeting selected in S911 are displayed, and recipients can be selected from among them to send the scanned data. Additionally, in S911, the CPU 201 may be controlled to display the recipient selection screen 1014 in a pre-configured state where an email address matching the logged-in user's email address used in S905 is unselectable as a recipient. Furthermore, if the selection of an online meeting or its schedule results in automatically determining (setting) the recipient information of the online meeting participants as the recipients of the email without displaying the recipient selection screen, the recipient information of the user logged into the MFP 200 (the user logged into the online meeting) may not be used as a recipient. This allows for omitting an unnecessary email transmission when the sender of the image data is included as a participant in the online meeting.

In S912, the CPU 201 determines whether a monochrome start key 1010 or a color start key 1011 displayed on the operation unit 205 has been selected. If it is determined that the key 1010 or 1011 has been selected, the process proceeds to S913. Otherwise, the process returns to S912.

In S913, the CPU 201 controls the reading unit 207 based on the scan settings to read the original and generate image data.

In S914, the CPU 201 converts the image data generated in S913 to a file format set on a sending setup screen.

In S915, the CPU 201 controls the communication unit 208 to attach the file generated in S914 to an email message and send it to the email server 500. Here, the recipients set for the email message here may be the recipient information (email addresses) selected by the user on the recipient selection screen 1014. Additionally, the recipients set for the email message may include the recipient information of multiple participants in an online meeting determined as the destination by selecting the online meeting on the online meeting selection screen 1012.

In S916, the CPU 201 determines whether the email message sent in S915 has been successfully sent to the email server 500. Specifically, it is determined that the email message has not been successfully sent if the status code in the SMTP response indicates an error. In the case where it is determined that the email message has been successfully sent, it is displayed on the operation unit 205 that the email message has been successfully sent. Otherwise, it is displayed on the operation unit 205 that the sending has failed.

Figure 10:
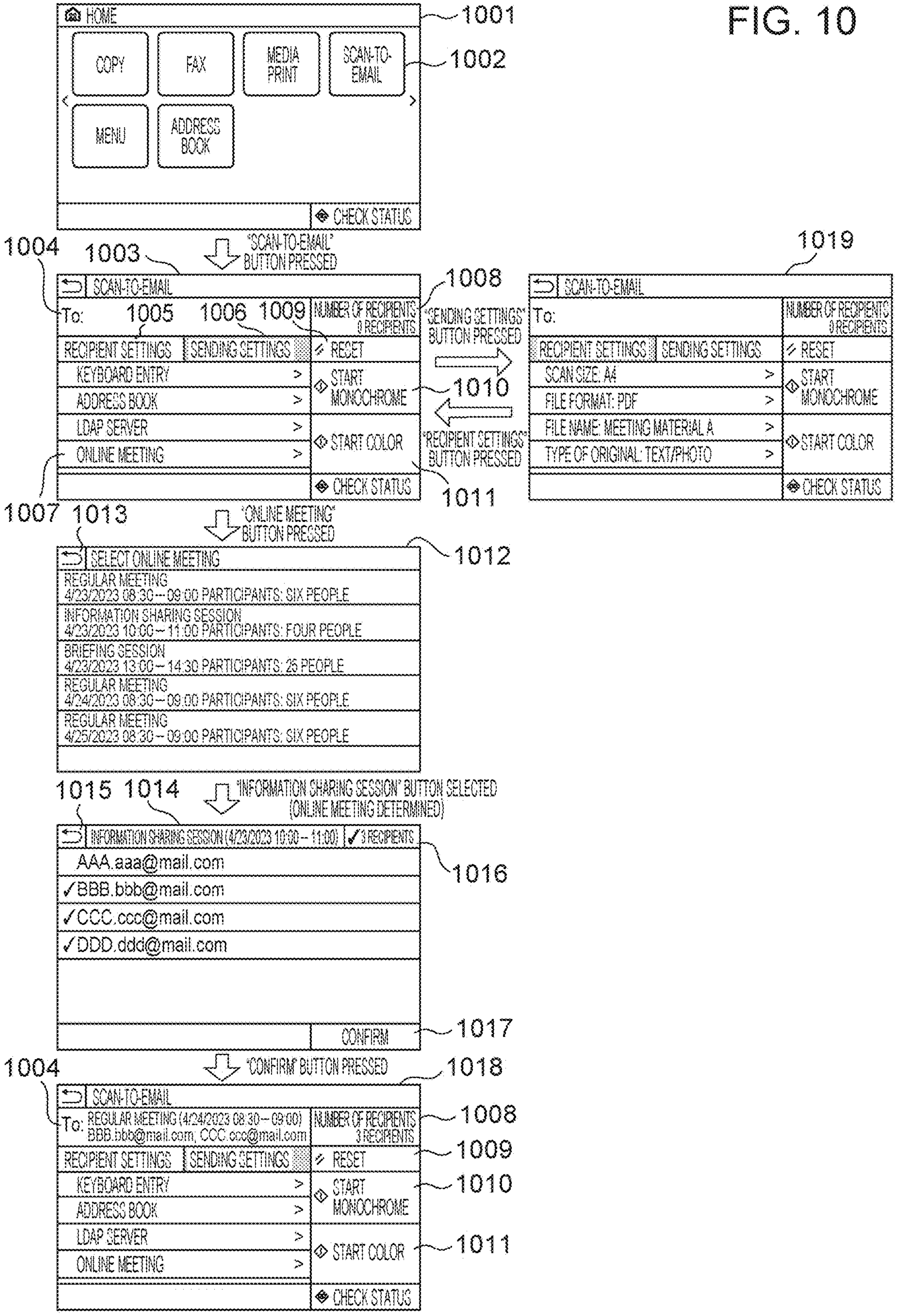
FIG. 10 is a diagram illustrating a graphical user interface (GUI) of scan-to-email.

FIG. 10 is a diagram illustrating an example of screen transitions in the process of sending scanned data to participants in an online meeting via scan-to-email. When the scan-to-email button 1002 displayed on the home screen 1001 is selected, the scan-to-email screen 1003 is displayed on the operation unit 205.

A reset button 1009 is displayed on the scan-to-email screen 1003. When the reset button 1009 is selected, the set information is cleared. At this time, the set recipient information and sending settings are cleared. Additionally, when the monochrome start key 1010 or the color start key 1011 is selected, a scan is started, and the generated image file is attached to an email message and sent to the email server 500.

When the recipient settings button 1005 is selected, the scan-to-email screen 1003 is displayed. On this screen, objects for setting email addresses as recipients are displayed. For example, a button to display a keyboard screen, a button to select recipients from an address book registered in the MFP 200 or from email addresses registered in an Lightweight Directory Access Protocol (LDAP) server, and the online meeting button 1007 to select recipients from participants in the online meeting are selectably displayed. In a recipient display field 1004, email addresses set as recipients by the online meeting button 1007 or the like are displayed. Moreover, the number of recipients set is displayed in a number-of-recipients field 1008.

When a sending settings button 1006 is selected, a sending setup screen 1019 is displayed. On this screen, scan settings and sending settings, such as the scan size, file format, and file name of an original to be scanned, can be selected and confirmed.

When the online meeting button 1007 is selected, the online meeting selection screen 1012 is displayed. A list of online meetings displayed on the online meeting selection screen 1012 is displayed based on online meeting information received by the MFP 200 from the online meeting server 400. For example, each online meeting's meeting name, date and time, and the number of participants are displayed. On this screen, an online meeting in which users serving as recipients are participating can be selected. When an online meeting is selected on the online meeting selection screen 1012, the recipient selection screen 1014 displaying the email addresses of participants in the selected online meeting is displayed. When the back button 1013 is selected, the scan-to-email screen 1003 is displayed again.

On the recipient selection screen 1014, email addresses to be recipients of scan-to-email can be selected. For example, email addresses designated as recipients will be displayed with a check mark indicating them as recipients. When an email address designated as a recipient is selected, it is excluded from the recipients, and the check mark indicating it as a recipient will be hidden.

In a number-of-recipients field 1016, the number of email addresses selected as recipients is displayed. The recipient selection screen 1014 may be displayed with the email addresses of all online meeting participants selected in advance as recipients. Alternatively, the recipient selection screen 1014 may be displayed in a pre-configured state where an email address matching the email address of a user logged into the online meeting server 400 is unselectable as a recipient. Furthermore, if the online meeting selected on the online meeting selection screen 1012 is currently ongoing or has already occurred, the recipient selection screen 1014 may be displayed with only the email addresses of users who have accessed the online meeting's meeting URL. When a back button 1015 is selected, the online meeting selection screen 1012 is displayed again. When a confirm button 1017 is selected, a scan-to-email screen 1018 is displayed. At this time, the recipient display field 1004 is displayed with the subject of the online meeting selected on the online meeting selection screen 1012, as well as the email addresses selected as recipients on the recipient selection screen 1014.

With the configuration described above, scanned data can be sent to participants in an online meeting without setting email addresses as recipients.

Second Embodiment

In the first embodiment, an example of scan-to-email in which the MFP 200 sends scanned data to the email server 500 has been described. In a second embodiment, an example in which the MFP 200 sends scanned data to a chat server will be described.

Figure 11:
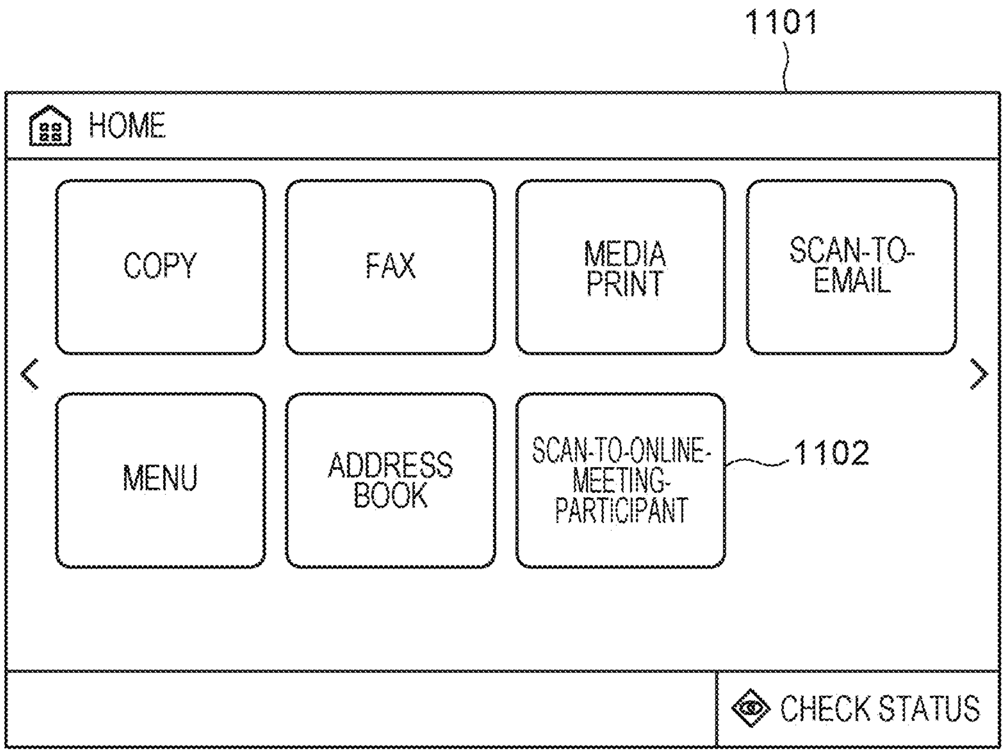
FIG. 11 is a diagram illustrating a scan-to-online-meeting-participant button.

FIG. 11 is a diagram illustrating an example in which a home screen 1101 according to the second embodiment is displayed with a scan-to-online-meeting-participant button 1102, which sends scanned data to participants in an online meeting using scan-to-chat. A scan-to-online-meeting-participant button 1102 is a button that executes a job according to scan settings and sending settings set by later-described button setup, and it is displayed on the home screen after the button setup.

Figure 12:
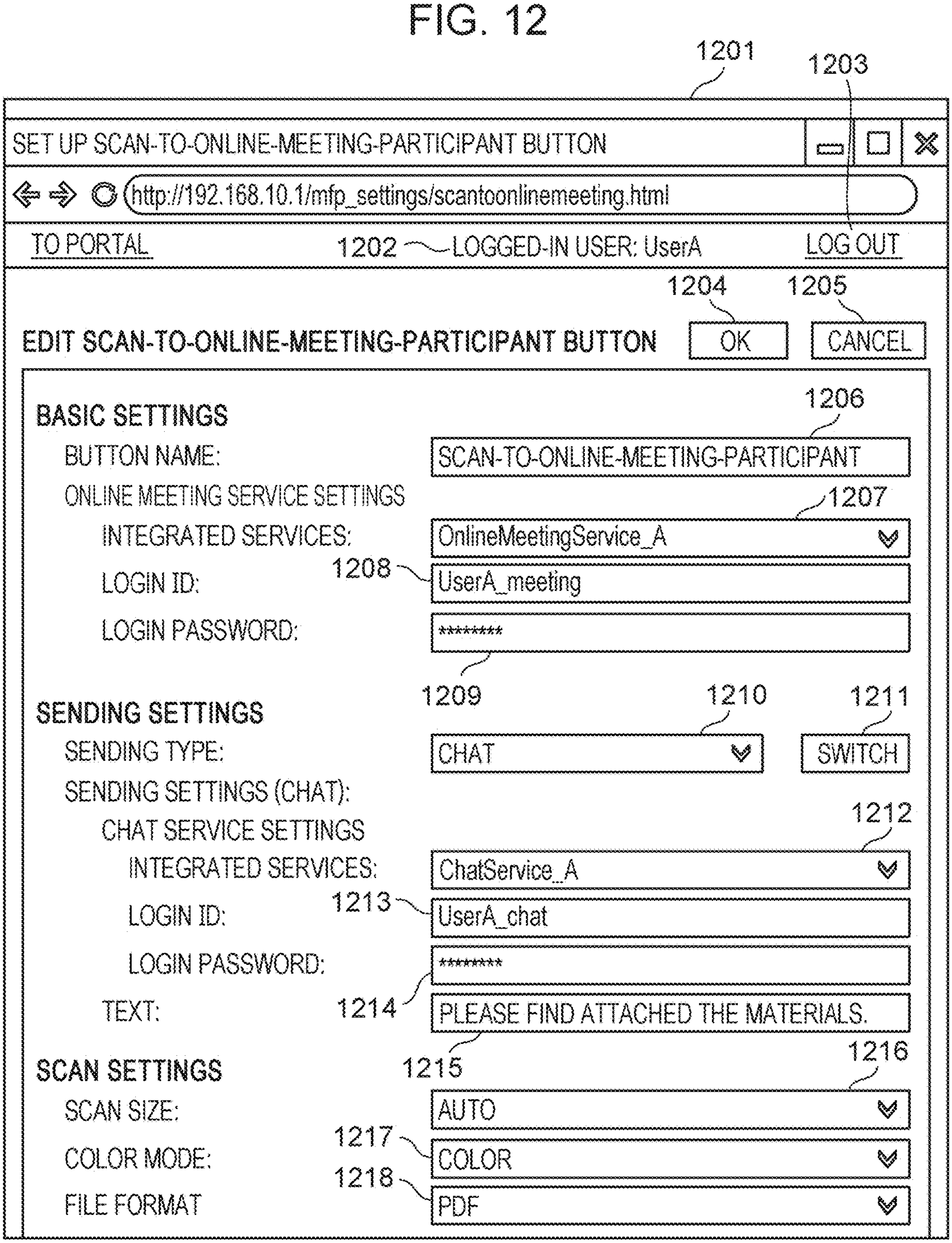
FIG. 12 is a diagram illustrating a job setup screen associated with the scan-to-online-meeting-participant button.

FIG. 12 is a diagram illustrating an example of a button setup screen for setting a job executed with the scan-to-online-meeting-participant button 1102. Button settings can be configured by accessing a button setup page provided by the MFP 200 from a browser 1201. A logged-in user field 1202 displays the username of a user logged into the MFP 200 for configuring button settings from the browser. To configure button settings, the user logs into the MFP 200 as a user with administrator authority of the MFP 200 or as a general user with permission to configure button settings. When a logout button 1203 is selected, the user logs out of the MFP 200, and the browser 1201 displays a screen indicating that the user has logged out of the MFP 200.

A button name field 1206 is used to set a button name to display on the home screen. A selection field 1207 is used to select an online meeting service for which the MFP 200 will request schedule information. The selection field 1207 is displayed with a list of online meeting services for which the MFP 200 can handle the process of acquiring schedule information, and selecting a desired online meeting service enables the acquisition of schedule information. A login ID field 1208 and a password field 1209 are used to set a login ID and a password for logging into the online meeting service selected in the selection field 1207.

A sending type field 1210 is used to select the type of sending scanned data. The types of sending include, for example, email, chat, and cloud storage services. The MFP 200 sends scanned data to the outside in accordance with the type of sending set in the sending type field 1210. A switching button 1211 is a button for switching the screen display to that for entering information required for sending scanned data via the type of sending selected in the sending type field 1210. For example, the following process is performed in response to the selection of the switching button 1211 with "chat" selected in the sending type field 1210. A chat service selection field 1212, entry fields (1213 and 1214) for entering the login ID and password to log in to the selected chat service, and a text field 1215 for setting a predefined message to be posted when registering in the chat are displayed.

A scan size selection field 1216, a color mode selection field 1217, and a file format selection field 1218 are used to configure scan settings, and a scan job is executed in accordance with the scan settings configured in the fields 1216 to 1218.

When an OK button 1204 is selected, the MFP 200 stores the job settings configured in the fields 1206 to 1218 in the storage 204, and displays a button for executing a job in accordance with the scan settings on the home screen 1101.

When a cancel button 1205 is selected, the information configured in the fields 1206 to 1218 is cleared, and the button setup is terminated.

Figure 13A:
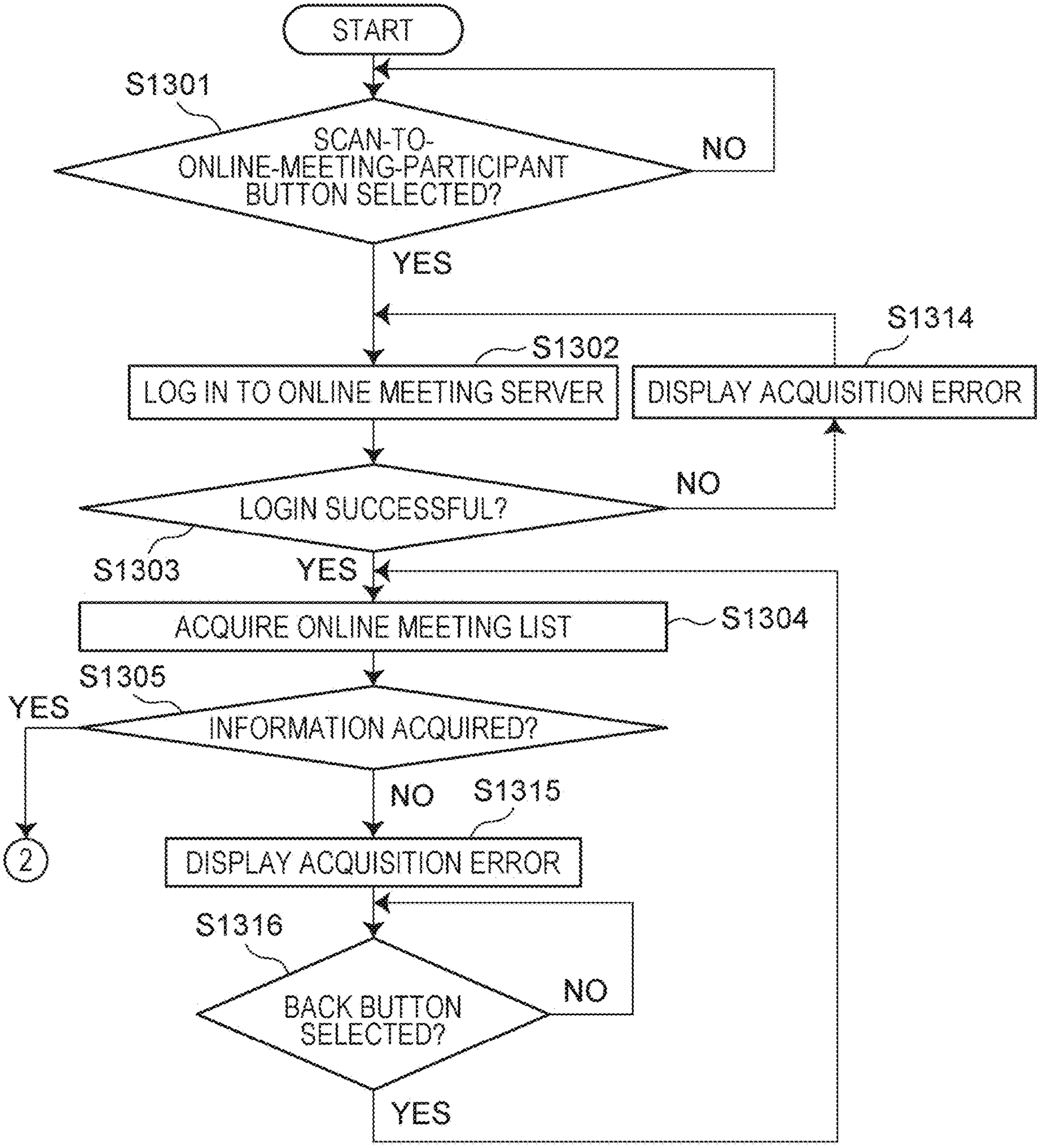
FIGS. 13A and 13B constitute a flowchart of sending scanned data with the scan-to-online-meeting-participant button.
Figure 13B:
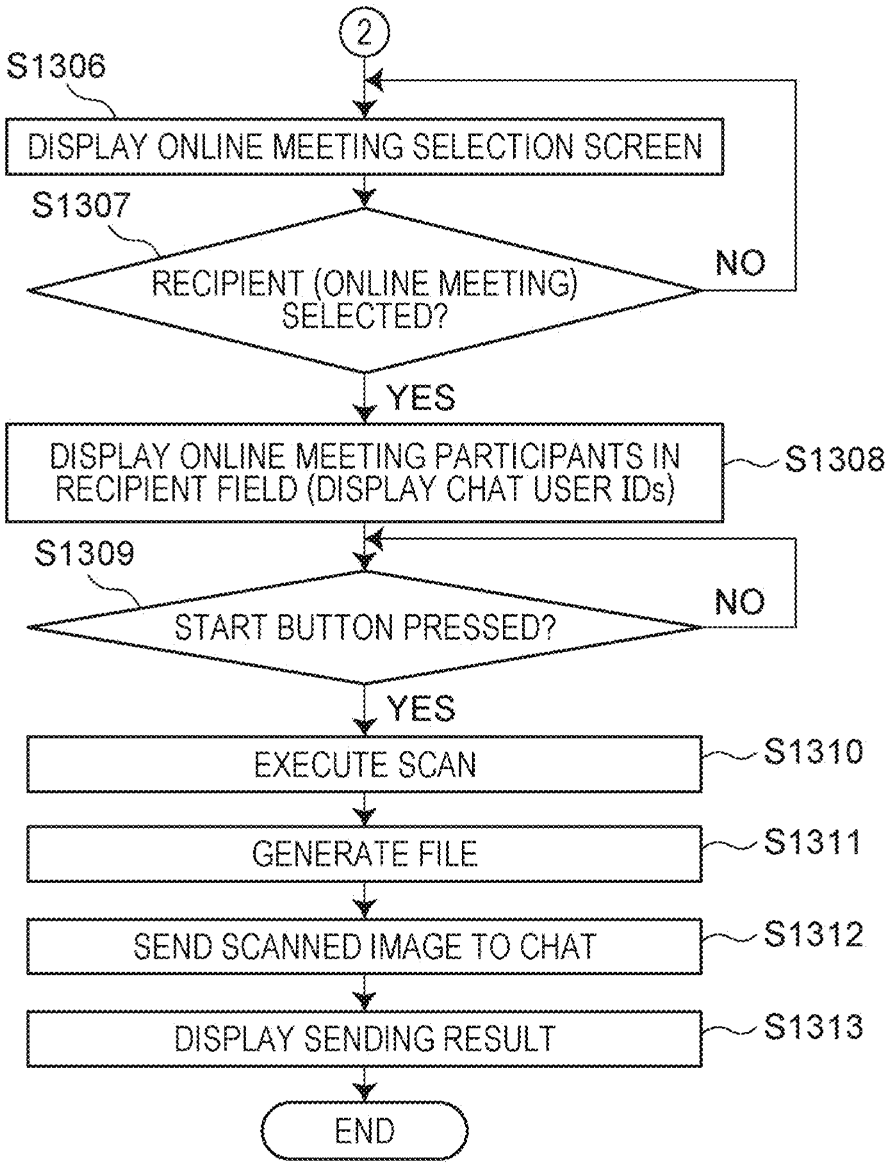

FIGS. 13A and 13B constitute a flowchart illustrating an example of a process of sending scanned data to participants in an online meeting via scan-to-chat. The process of this flowchart is executed by the CPU 201 of the MFP 200 reading a program stored in the ROM 202 into the RAM 203. In addition, the flow illustrated in FIGS. 13A and 13B starts upon the powering on of the MFP 200.

In S1301, the CPU 201 determines whether the scan-to-online-meeting-participant button 1102 for executing a job in accordance with the button settings illustrated in FIG. 12 has been selected. If it is determined that the button 1102 has been selected, the process proceeds to S1302. Otherwise, the process returns to S1301.

In S1302, the CPU 201 controls the communication unit 208 to send the information set in the login ID field 1208 and the password field 1209 to the online meeting server 400 in order to log in to the online meeting service selected in the selection field 1207.

In S1303, the CPU 201 determines whether a token has been received from the online meeting server 400 for the login information sent in S1302. Specifically, it is determined that the token has not been received if the status code in the HTTP communication response indicates an error or if the body information of the response includes a parameter indicating that information could not be acquired. If it is determined that the token has been received, the process proceeds to S1304. Otherwise, the process proceeds to S1314.

In S1314, the CPU 201 displays information on the operation unit 205, indicating that the user could not log in to the online meeting server 400.

In S1304, the CPU 201 uses the token information acquired in S1303 to execute a process of sending information indicating that schedule information is requested in HTTP communication to the online meeting server 400.

In S1305, the CPU 201 determines whether schedule information has been received from the online meeting server 400 for the schedule information request sent in S1304. Specifically, it is determined that the schedule information has not been received if the status code in the HTTP communication response indicates an error or if the body information of the response includes a parameter indicating that information could not be acquired. If it is determined that the schedule information has been received, the process proceeds to S1306. Otherwise, the process proceeds to S1315.

In S1315, the CPU 201 displays information indicating that the online meeting information could not be received on an online meeting selection screen 1403. At this time, the online meeting selection screen 1403 does not display any options for online meetings.

In S1316, the CPU 201 determines whether a back button 1404 has been selected. If it is determined that the back button 1404 has been selected, the process returns to S1304. Otherwise, the process returns to S1316.

In S1306, the CPU 201 displays a list based on the schedule information received from the online meeting server 400 on the online meeting selection screen 1403.

In S1307, the CPU 201 detects, via the operation unit 205, whether an online meeting that users designated as recipients are participating in has been selected on the online meeting selection screen 1403. If it is determined that such an online meeting has been selected, the process transitions to S1308. Otherwise, the process transitions to S1306. The method for detecting selection is whether any item in the list displayed on the online meeting selection screen 1403 has been selected. In the case of a screen configuration in which a confirm button is displayed on the screen of the operation unit 205, the same transition is performed when the confirm button is selected.

In S1308, the CPU 201 controls the operation unit 205 to display the chat IDs of users participating in the online meeting selected in S1307 on a recipient selection screen 1405. The recipient selection screen 1405 displays the chat IDs of all users participating in the online meeting selected in S1307, and recipients for sending the scanned data can be chosen from among these chat IDs. Additionally, in S1308, the CPU 201 may be controlled to display the recipient selection screen 1405 in a pre-configured state where a chat ID matching the logged-in user's chat ID used in S1302 is unselectable as a recipient.

In S1309, the CPU 201 determines whether a yes button 1410 displayed on the operation unit 205 has been selected. If it is determined that the yes button 1410 has been selected, the process proceeds to S1310. Otherwise, the process returns to S1309.

In S1310, the CPU 201 controls the reading unit 207 to read an original and generate image data based on the scan settings configured in the scan size selection field 1216 and the color mode selection field 1217.

In S1311, the CPU 201 converts the image data generated in S1310 to a file format set in the file format selection field 1218.

In S1312, the CPU 201 controls the communication unit 208 to send the file generated in S1311 to the chat server. Additionally, a message set in the text field 1215 may be posted to the chat server, along with the file transmission.

In S1313, the CPU 201 determines whether the scanned data sent in S1312 has been successfully sent to the chat server. Specifically, it is determined that the sending of the scanned data has failed if the status code in the HTTP response indicates an error or if the body information of the response includes a parameter indicating that the scanned data could not be received. In the case where it is determined that the scanned data has been successfully sent, it is displayed on the operation unit 205 that the scanned data has been successfully sent. Otherwise, it is displayed on the operation unit 205 that the sending has failed.

Figure 14:
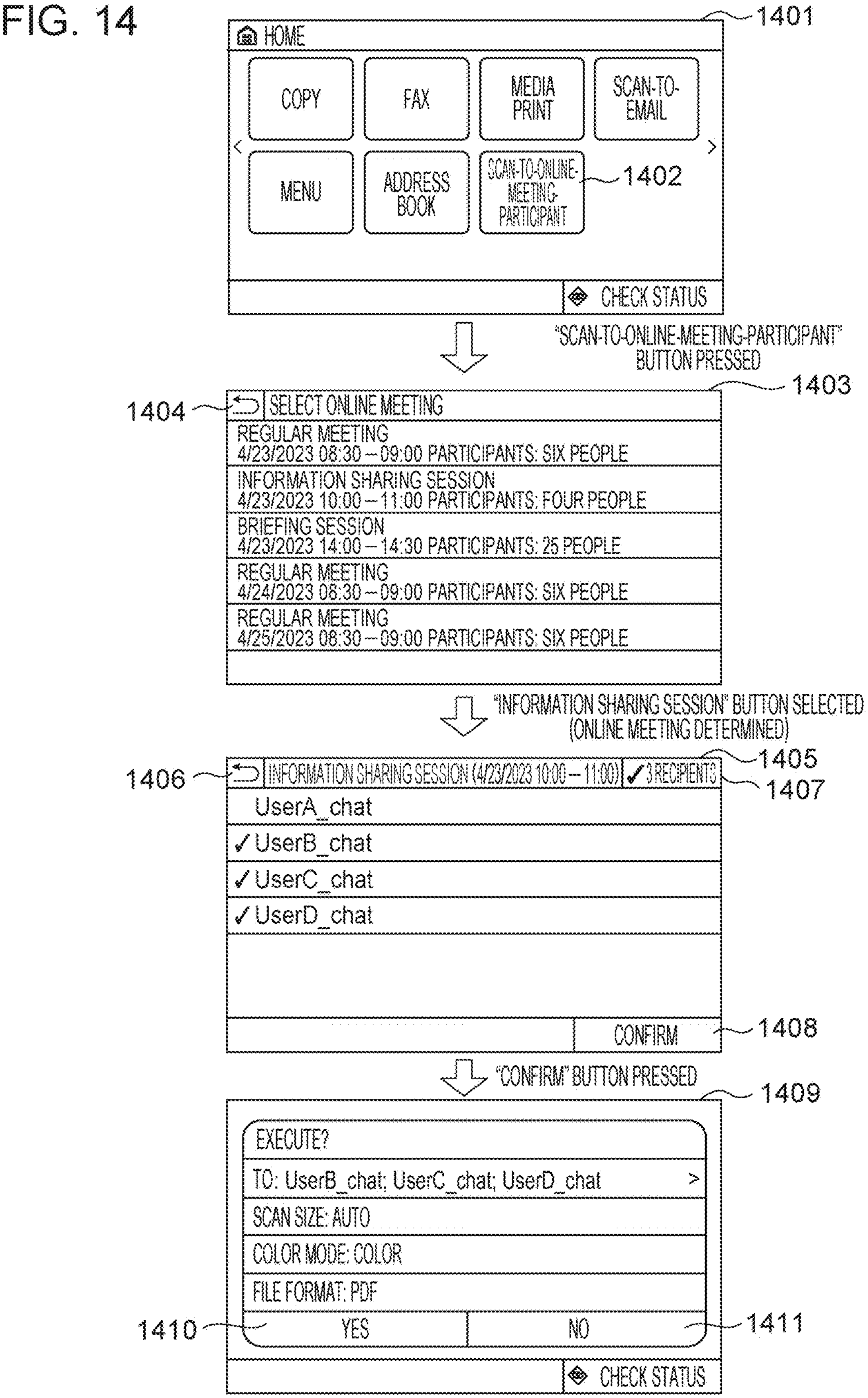
FIG. 14 is a diagram illustrating a GUI of the scan-to-online-meeting-participant button.

FIG. 14 is a diagram illustrating an example of screen transitions in the process of sending scanned data via chat to participants in an online meeting using scan-to-online-meeting-participant. The online meeting selection screen 1403 is displayed in response to the selection of a scan-to-online-meeting-participant button 1402 displayed on a home screen 1401. A list of online meetings displayed on the online meeting selection screen 1403 is displayed based on online meeting information received by the MFP 200 from the online meeting server 400. For example, each online meeting's meeting name, date and time, and the number of participants are displayed. On this screen, an online meeting in which users serving as recipients are participating can be selected. When an online meeting is selected on the online meeting selection screen 1403, the recipient selection screen 1405 displaying the chat IDs of participants in the selected online meeting is displayed. When the back button 1404 is selected, the home screen 1401 is displayed again.

On the recipient selection screen 1405, chat IDs to be recipients of scan-to-chat can be selected. For example, chat IDs designated as recipients will be displayed with a check mark indicating them as recipients. When a chat ID designated as a recipient is selected, it is excluded from the recipients, and the check mark indicating it as a recipient will be hidden. In a number-of-recipients field 1407, the number of chat IDs selected as recipients is displayed. The recipient selection screen 1405 may be displayed with the chat IDs of all online meeting participants selected in advance as recipients. Alternatively, the recipient selection screen 1405 may be displayed in a pre-configured state where a chat ID matching the chat ID of a user logged into the online meeting server 400 is unselectable as a recipient. Furthermore, if the online meeting selected on the online meeting selection screen 1403 is currently ongoing or has already occurred, the recipient selection screen 1405 may be displayed with only the chat IDs of users who have accessed the online meeting's meeting URL. When a back button 1406 is selected, the online meeting selection screen 1403 is displayed again. When a confirm button 1408 is selected, a job settings confirmation screen 1409 is displayed, indicating recipients and scan settings. When the yes button 1410 displayed on the job settings confirmation screen 1409 is selected, scanned data is sent to the chat IDs selected on the recipient selection screen 1405. When a no button 1411 is selected, the home screen 1401 is displayed again.

Figure 15:
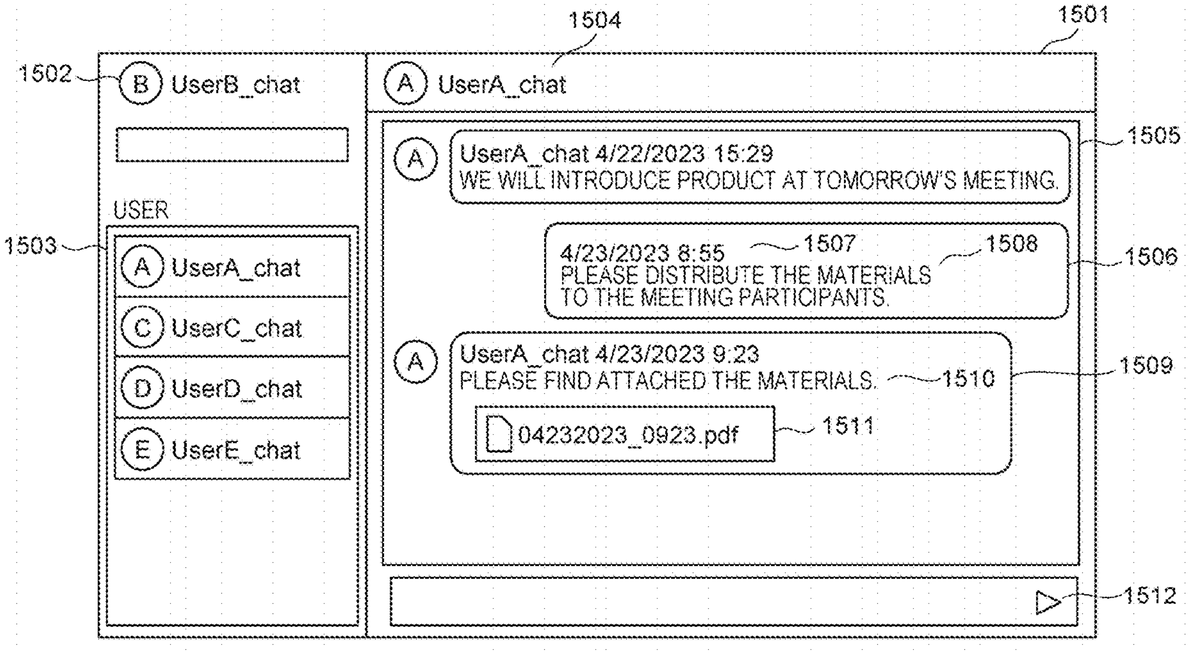
FIG. 15 is a diagram illustrating a GUI of a chat application.

FIG. 15 is a diagram illustrating an example in which scanned data sent from the MFP 200 is received by the chat server, and a notification indicating the receipt is displayed on a chat application.

A chat application screen 1501 is displayed on the display unit 306 of the terminal device 300.

A logged-in user ID field 1502 displays the chat ID of a user logged into the chat server. A user selection field 1503 displays a list of user IDs capable of exchanging messages and files via chat. By selecting a desired user, the exchange of messages and files via chat with the selected user is started. A recipient user ID field 1504 displays the user ID of the user selected in the user selection field 1503. A chat field 1505 displays exchanges via chat between the user displayed in the recipient user ID field 1504 (UserA_chat) and the user logged into the chat application (UserB_chat). A message bubble 1506 displays a message 1508 sent by UserB_chat, along with its sending date and time 1507. A message can be sent by entering any character string in a message entry field 1512. A message bubble 1509 indicates that the user whose chat ID is UserA_chat sent scanned data to UserB_chat, who is a participant in the online meeting, using the scan-to-online-meeting-participant button. The message bubble 1509 is attached with a message 1510, set in the text field 1215, and scanned data 1511.

With the configuration described above, scanned data can be sent to participants in an online meeting without setting chat IDs as recipients.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-133941, filed Aug. 21, 2023, which is hereby incorporated by reference herein in its entirety.

What is claimed is:

1. An image processing apparatus comprising:

a display;

a scanner that scans an original to generate image data;

a controller that:

receives selection of an online meeting from a plurality of online meetings;

acquires identification information about participants in the selected online meeting from an online meeting service;

displays, in response to the selection of the online meeting, a screen including identification information of respective chats in which a user communicates via a message with each of the participants indicated by the acquired identification information, wherein, in the screen, identification information corresponding to a user who logs in to the online meeting service via the image processing apparatus is displayed in an unselected but selectable state, and wherein, in the screen, identification information corresponding to participants other than the user is displayed in a selected state; and a communicator that transmits the generated image data to one or more chats corresponding to the identification information in the selected state.

2. The image processing apparatus according to claim 1, wherein:

the controller displays the identification information corresponding to the selected online meeting.

3. The image processing apparatus according to claim 1, wherein, in a case where the selected online meeting is an online meeting in progress or an online meeting already held, the controller displays, in the screen, only identification information corresponding to users who have accessed a meeting URL of the selected online meeting.

4. The image processing apparatus according to claim 1, further comprising:

a feeder that feeds the original, wherein the scanner scans the original fed by the feeder and generates the image data.

5. The image processing apparatus according to claim 1, wherein:

the identification information is a chat ID.

6. An image processing system comprising:

a display;

a scanner that scans an original to generate image data;

a controller that:

receives selection of an online meeting from a plurality of online meetings;

acquires identification information about participants in the selected online meeting from an online meeting service, displays, in response to the selection of the online meeting, a screen including identification information of respective chats in which a user communicates via a message with each of the participants indicated by the acquired identification information, wherein, in the screen, identification information corresponding to a user who logs in to the online meeting service via an image processing apparatus is displayed in an unselected but selectable state, and wherein, in the screen, identification information corresponding to participants other than the user is displayed in a selected state; and a communicator that transmits the generated image data to one or more chats corresponding to the identification information in the selected state.

7. The image processing system according to claim 6, wherein:

the controller displays the identification information corresponding to the selected online meeting.

8. The image processing system according to claim 6, wherein, in a case where the selected online meeting is an online meeting in progress or an online meeting already held, the controller displays, in the screen, only identification information corresponding to users who have accessed a meeting URL of the selected online meeting.

9. The image processing system according to claim 6, further comprising:

a feeder that feeds the original, wherein the scanner scans the original fed by the feeder and generates the image data.

10. The image processing system according to claim 6, wherein:

the identification information is a chat ID.

11. An image processing method comprising:

scanning an original to generate image data;

receiving selection of an online meeting from a plurality of online meetings;

acquiring identification information about participants in the selected online meeting from an online meeting service;

displaying, in response to the selection of the online meeting, a screen including identification information of respective chats in which a user communicates via a message with each of the participants indicated by the acquired identification information, wherein, in the screen, identification information corresponding to a user who logs in to the online meeting service via an image processing apparatus is displayed in an unselected but selectable state, and wherein, in the screen, identification information corresponding to participants other than the user is displayed in a selected state; and transmitting the generated image data to one or more chats corresponding to the selected identification information in the selected state.

12. The image processing method according to claim 11, wherein the displaying includes displaying the identification information corresponding to the selected online meeting.

13. The image processing method according to claim 11, further comprising:

feeding the original, wherein the scanning scans the fed original and generates the image data.

14. The image processing method according to claim 11, wherein, in a case where the selected online meeting is an online meeting in progress or an online meeting already held, the displaying includes displaying, in the screen, only identification information corresponding to users who have accessed a meeting URL of the selected online meeting.

* * * * *